United States Patent
Kobussen et al.

(10) Patent No.: US 6,290,590 B1
(45) Date of Patent: Sep. 18, 2001

(54) METHOD AND APPARATUS FOR PRECRIMPING A SAUSAGE STRAND

(75) Inventors: Jaap Kobussen, La Veghel (NL); Jos Kobussen; Mart Kobussen, both of Indianola, IA (US); Lambertus G. M. Klaassen, Michielsgestel (NL); Robert Dirksen, Johnston, IA (US)

(73) Assignee: Townsend Engineering Company, Des Moine, IA (US)

( * ) Notice: Subject to any disclaimer, the term of this patent is extended or adjusted under 35 U.S.C. 154(b) by 0 days.

(21) Appl. No.: 09/524,229

(22) Filed: Mar. 13, 2000

(51) Int. Cl.⁷ ................................................ A22C 11/00
(52) U.S. Cl. ................................................ 452/49
(58) Field of Search .................................. 452/49, 48, 46

(56) References Cited

U.S. PATENT DOCUMENTS

| | | | |
|---|---|---|---|
| 3,808,636 | * 5/1974 | Gouba | 452/49 |
| 5,156,566 | * 10/1992 | Righele | 452/46 |
| 5,173,075 | * 12/1992 | Wadell | 452/49 |
| 5,709,600 | * 1/1998 | Xie et al. | 452/49 |
| 5,759,602 | 6/1998 | Kobussen et al. | |
| 6,013,295 | 1/2000 | Kobussen et al. | |

* cited by examiner

Primary Examiner—Willis Little
(74) Attorney, Agent, or Firm—Zarley, McKee, Thomte, Voorhees & Sease

(57) ABSTRACT

A method and apparatus for cutting sausages squeezes the meat inside the casing by a crimping wheel to move the meat emulsion away from the linking point to provide sufficient casing to close the ends of the proposed links and to prevent bursting of the casing. This is accomplished by passing the unlinked sausage strand over a crimping wheel to crimp the proposed linking points, reshaping the sausage strand at the linking points, and then subsequently cutting the precrimped link points.

11 Claims, 6 Drawing Sheets

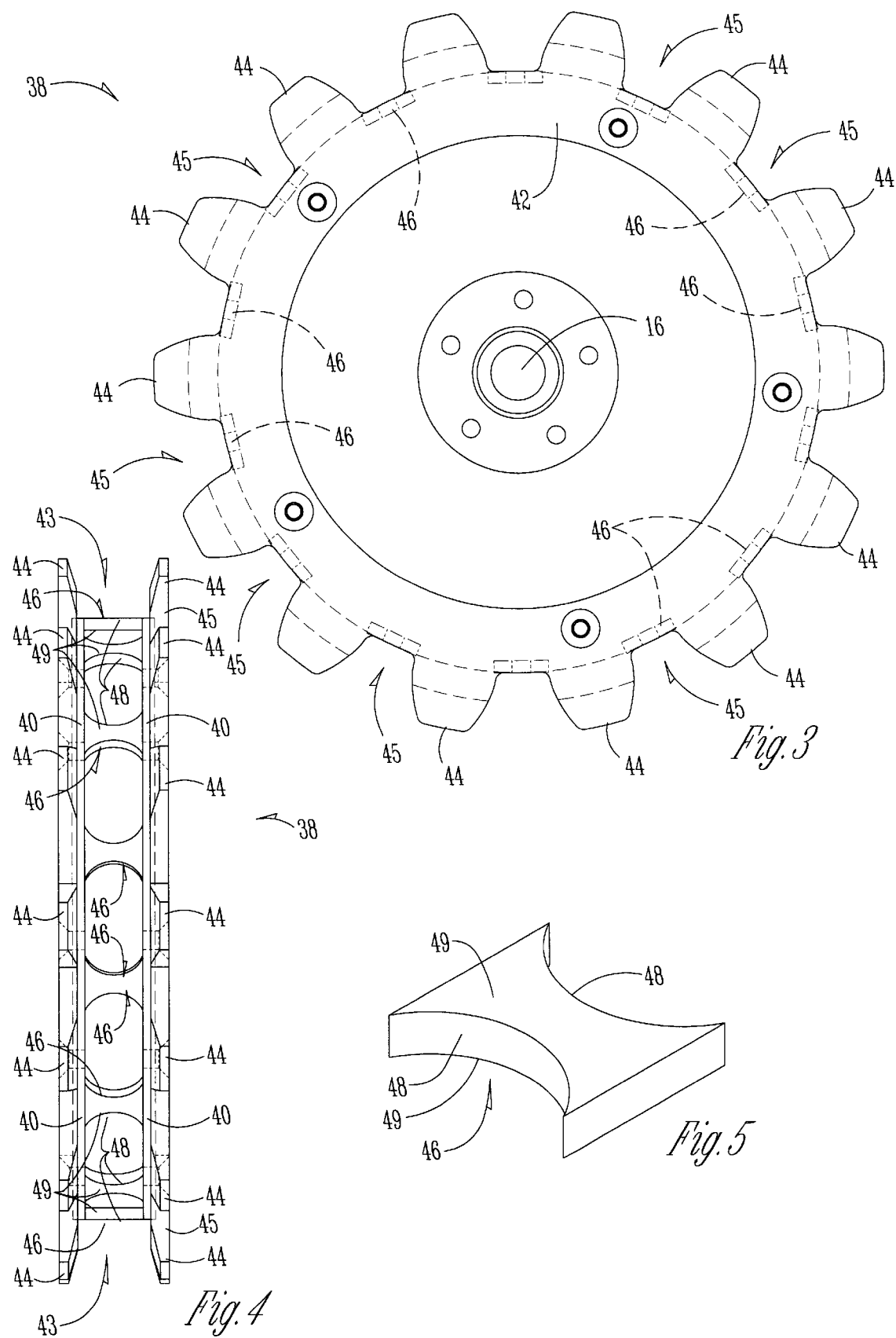

METHOD AND APPARATUS FOR PRECRIMPING A SAUSAGE STRAND

BACKGROUND OF THE INVENTION

In the production of sausages, care must be exercised in cutting a strand of sausage into links. If the casing for the sausage is damaged or fractured during the cutting operation, the meat emulsion in the core of the strand will escape and the adjacent sausages will be destroyed. This is particularly true in a strand formed by a coextrusion process where the casing is not a separate disposable casing material, but is a coagulated layer of edible material.

It is therefore a principal object of this invention to provide a method and apparatus to precrimp a strand of sausage at the proposed link points prior to cutting to pre-condition or pre-shape the link points for readiness for the cutting process.

It is a further object of this invention to pre-shape the proposed link points for the sausage strand to relocate the meat emulsion at those points to relieve the sausage pressure on the casing that is to be cut.

These and other objects will be apparent to those skilled in the art.

SUMMARY OF THE INVENTION

A method and apparatus for cutting sausages squeezes the meat inside the casing by a crimping wheel to move the meat emulsion away from the linking point to provide sufficient casing to close the ends of the proposed links and to prevent bursting of the casing. This is accomplished by passing the unlinked sausage strand over a crimping wheel to crimp the proposed linking points, reshaping the sausage strand at the linking points, and then subsequently cutting the precrimped link points.

BRIEF DESCRIPTION OF THE DRAWINGS

FIG. 3 is an enlarged scale side elevational view of the crimper wheel;

FIG. 4 is an elevational view of the crimper wheel as seen from the left-hand side of FIG. 3;

FIG. 5 is a perspective view of a crimper element;

DESCRIPTION OF THE PREFERRED EMBODIMENT

Figure 1:
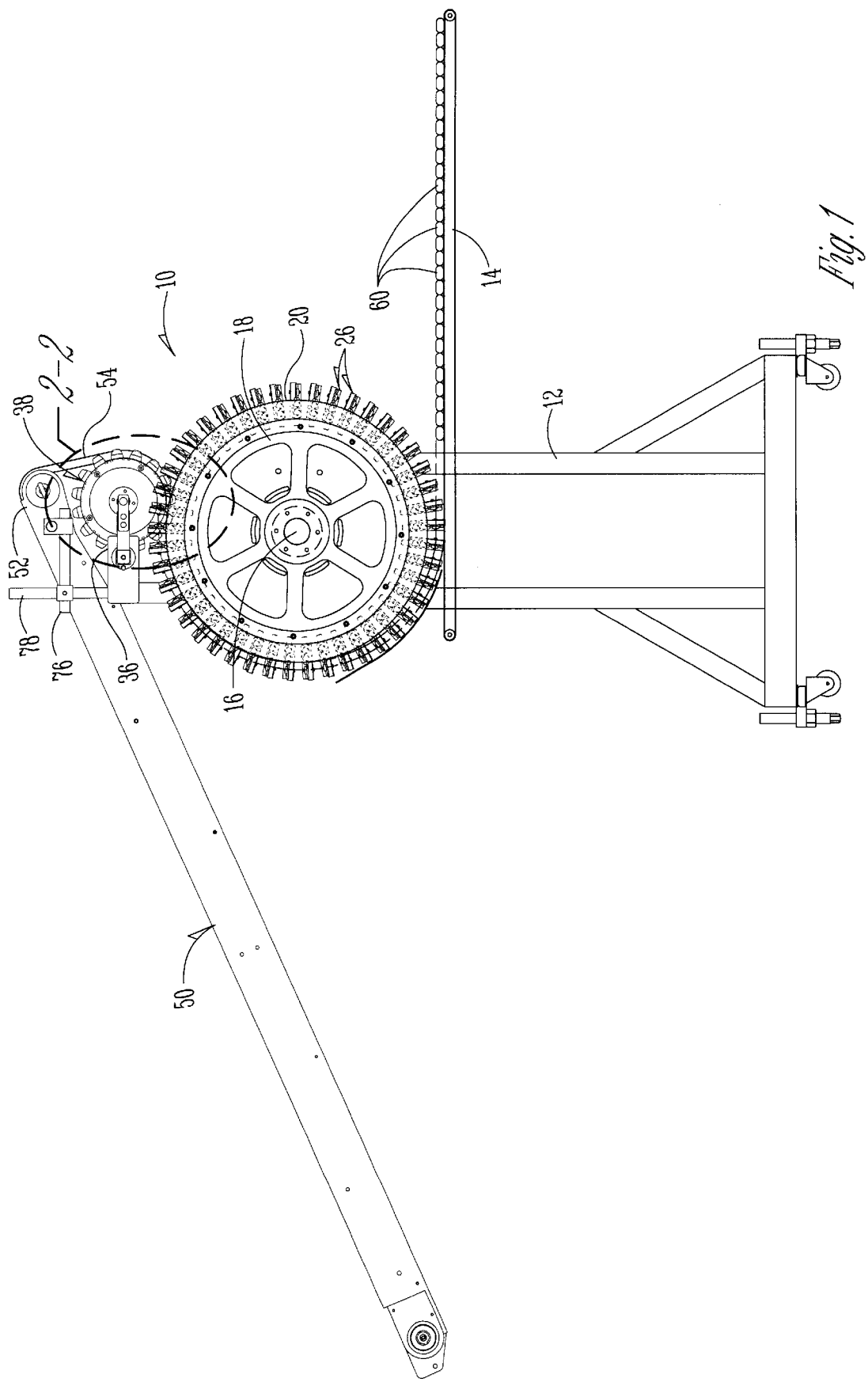
FIG. 1 is an elevational view of the machine of this invention.

The precrimping machine 10 is best shown in FIG. 1, and includes a frame 12 to which is secured a conventional horizontal continuous belt conveyor 14. A horizontal shaft 16 is supported by the frame above one end of conveyor 14 and is rigidly secured to wheel 18. Shaft 16 is connected to a suitable source of rotational power (not shown). Wheel 18 has an outer periphery 20 (FIGS. 1 and 6).

Figure 6:
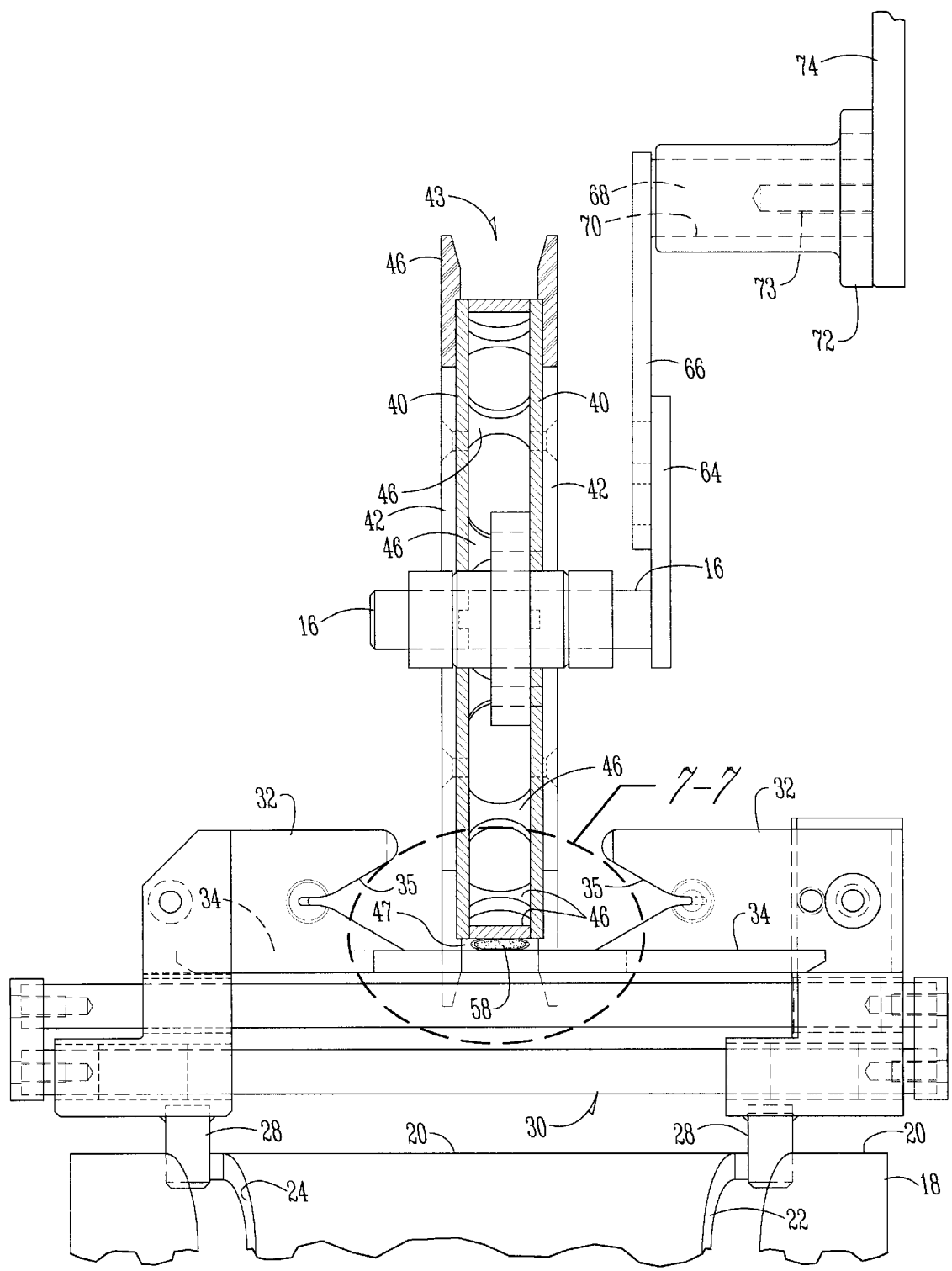
FIG. 6 is an enlarged scale sectional view of the crimper wheel and cutting and conveying assembly as viewed from the right-hand side of FIG. 1.

As best shown in FIG. 6, a pair of cam grooves 22 and 24 are formed in the outer periphery 20 of wheel 18. The cam grooves are primarily in parallel relationship between the six o'clock and twelve o'clock positions of the wheel 18 as seen in FIG. 1. However, the cam grooves 22 converge towards each other between the twelve o'clock and eight o'clock positions as viewed in FIG. 1 whereupon they extend away from each other between the point of maximum convergence back to their relatively parallel position between the eight o'clock and six o'clock positions as viewed in FIG. 1. The purpose of the converging portions of the cam grooves 20 and 24 will be discussed hereafter.

Figure 8:
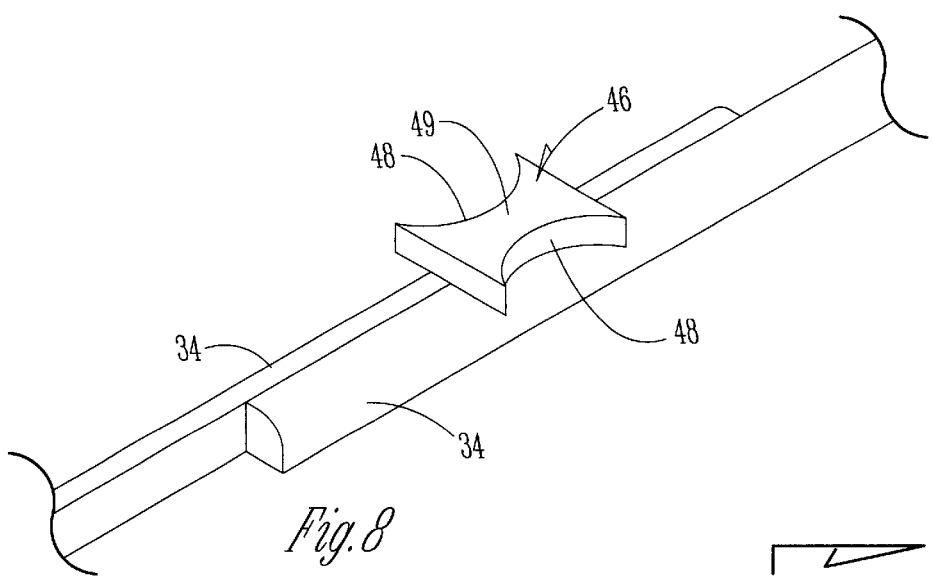
FIG. 8 is an enlarged scale perspective view showing the crimping element and its relation to bars on the cutting and conveying assembly.
Figure 9:
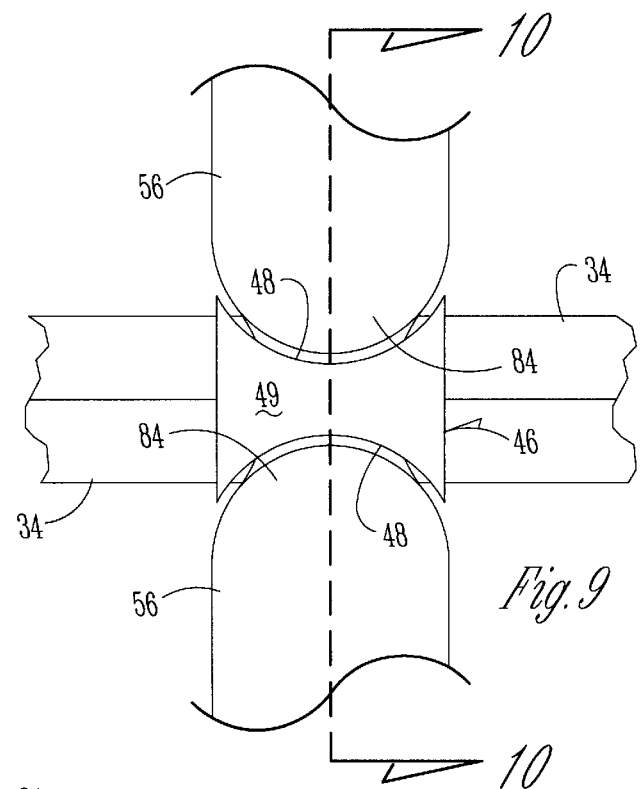
FIG. 9 is an enlarged scale plan view of FIG. 8 with a sausage strand being compressed.

As best shown in FIG. 6, a plurality of conveying and cutting assemblies 26 are mounted on the outer periphery 20 of wheel 18. The assemblies 26 are radially spaced a distance substantially equal to the length of the sausage links to be treated by the machine 10. Each assembly 28 has downwardly extending cam elements 28 that extend into the cam grooves 22 and 24. The assemblies include a subframe 30, (FIG. 6) which has opposed cutting elements 32 slidably mounted thereon. The cutting elements include elongated parallel bars 34 (FIGS. 6 and 8) which are slidably positioned with respect to each other (FIG. 8). The spacing of the cam grooves 22 and 24 determine the relative positions of the cutting elements 32. As seen in FIG. 6, which shows an assembly 26 at a twelve o'clock position of wheel 18 as shown in FIG. 1, the cutting elements are completely separated in a non-cutting disposition. As previously discussed, the cam grooves 22 and 24 begin to gradually converge between the twelve o'clock and eight o'clock positions which gradually cause the cam elements 28 to converge and to slide the cutting elements 32 towards each other where the cutting edges 35 are completely superimposed upon each other so as to sever the portion of a sausage strand dwelling therebetween. This takes place at the eight o'clock position. After a sausage strand is cut at the eight o'clock position, the cutting elements begin to separate because the cam grooves 22 and 24 begin to gradually resume their parallel relationship. The cam elements 28 follow this path of the cam grooves 22 and 24 between the eight o'clock and six o'clock positions so that at the six o'clock position, the assemblies 26 resume their full open positions as typically shown in FIG. 6.

Figure 2:
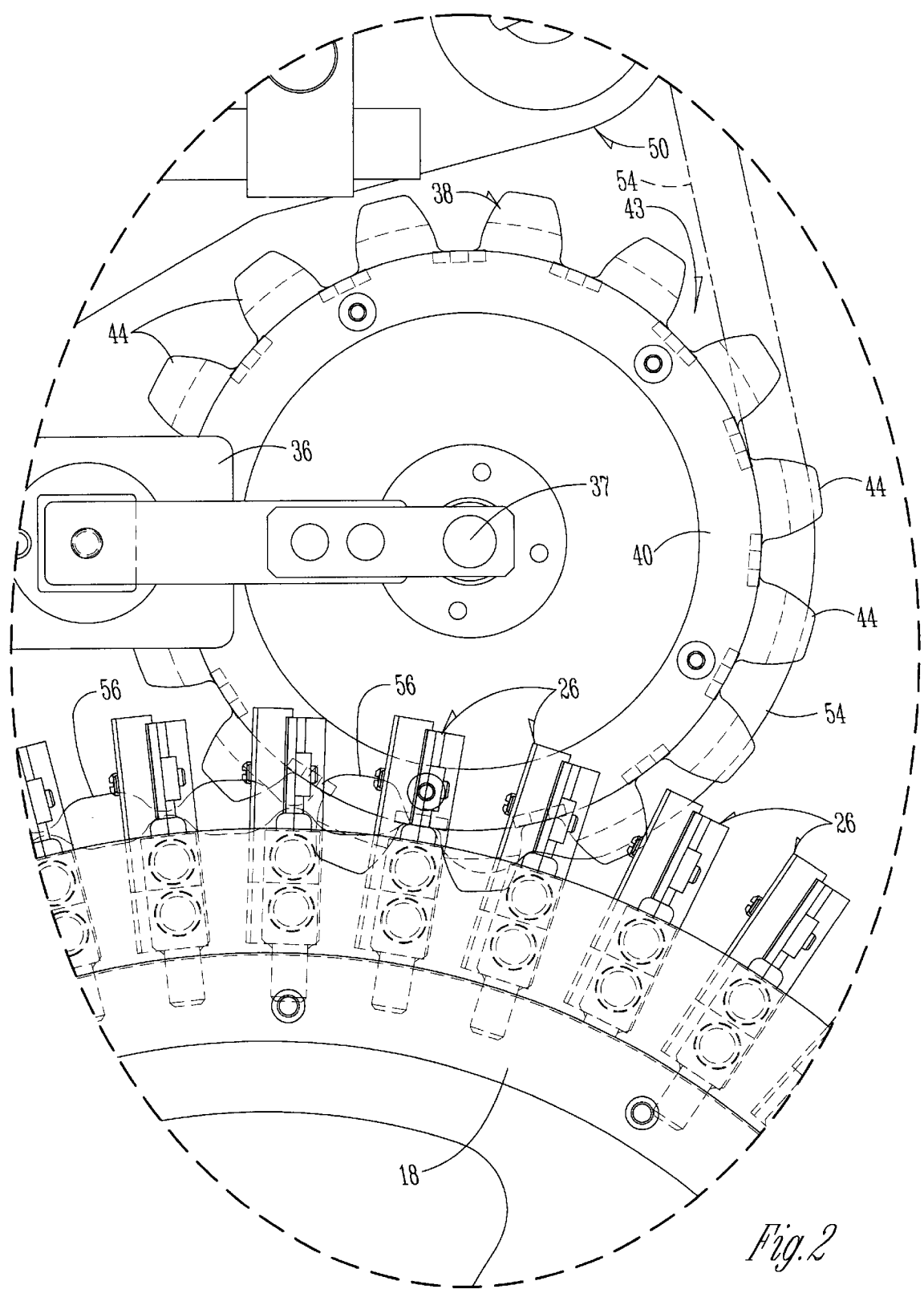
FIG. 2 is an enlarged scale elevational view of the portion of FIG. 1 outlined by the line 2—2.

With reference to FIGS. 1 and 2, a bracket 36 is pivotally secured to frame 10 and rotatably supports shaft 37 upon which the crimping wheel 38 is mounted (FIGS. 1 and 6). Crimping wheel 38 includes a pair of parallel spaced plates 40 (FIG. 6) which are fixedly secured to parallel tooth plates 42. As shown in FIGS. 4 and 6, the tooth plates 42 create a track 43 for a sausage strand to dwell within. A plurality of spaced teeth 44 are an integral part of tooth plates 42 and help define the track 43 for the sausage strand. The teeth 44 have spaces 45 therebetween (FIG. 3).

Crimper elements 46 are rigidly mounted between plates 40 (FIGS. 4, 5 and 6). The crimper elements are closely spaced from the bars 34 as indicated by the space 47 shown best in FIGS. 6 and 7. The crimper elements have arcuate leading and trailing edges 48, and a center portion 49 (FIG. 10) which cooperates with the bars 34 (FIG. 8) to effect the crimping force on a sausage strand as the crimping elements move over the bars 34 when a sausage strand is positioned within track 43. It should be noted that the crimper elements 46 are located within the spaces 45 in between teeth 44.

Figure 7:
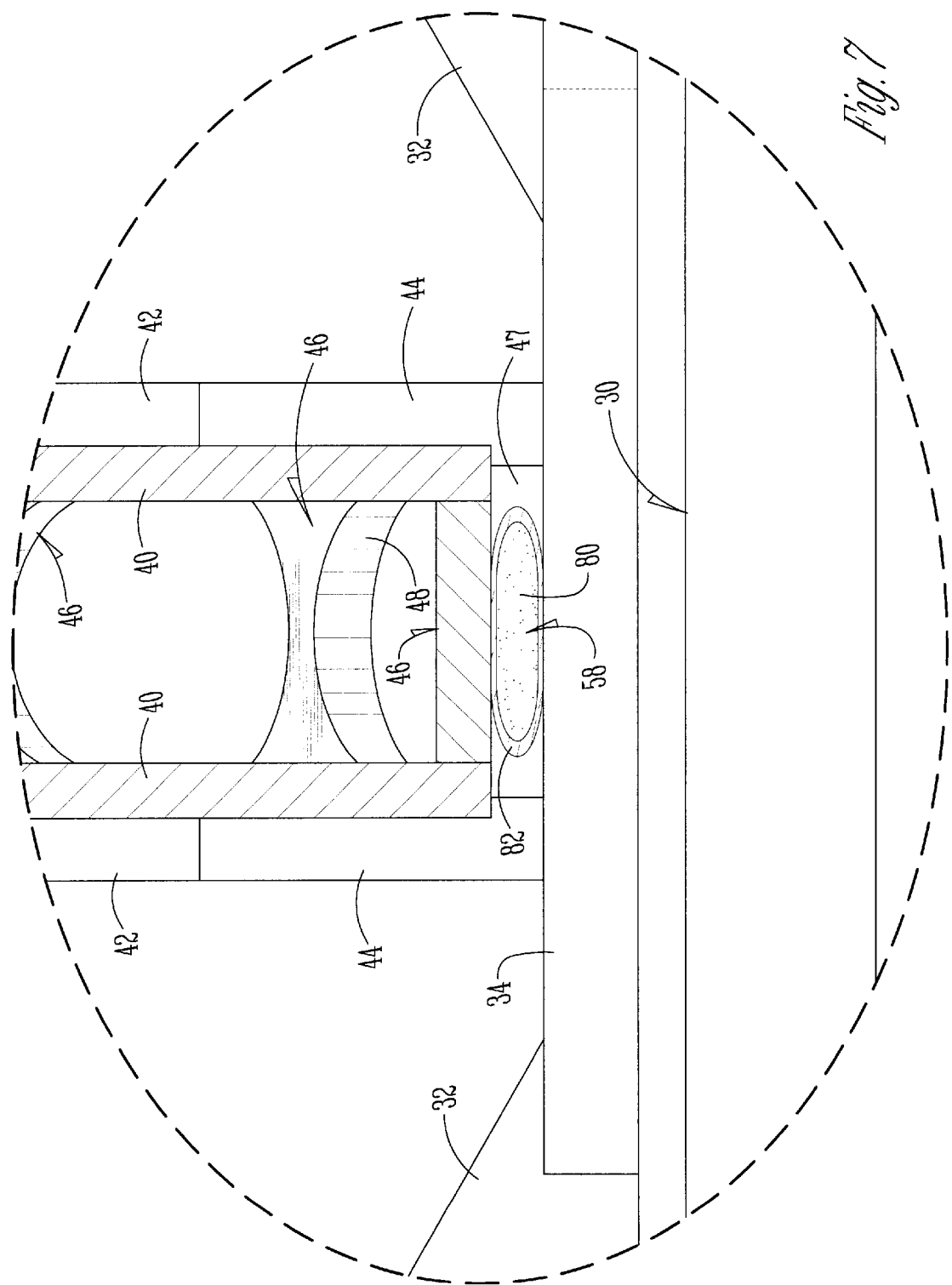
FIG. 7 is an enlarged scale sectional view taken on line 7—7 of FIG. 6.
Figure 10:
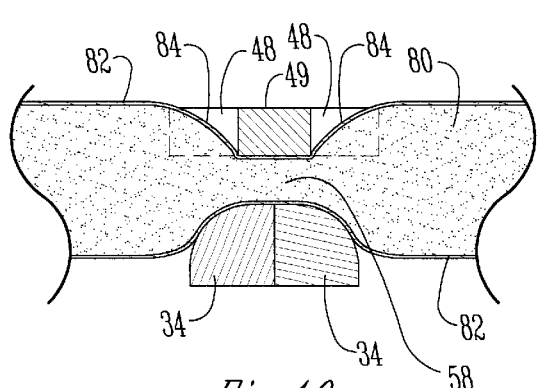
FIG. 10 is a reduced scale sectional view taken on line 10—10 of FIG. 9.

A conventional endless belt conveyor 50 is positioned adjacent frame 12 and has an upper end 52. Conveyor 50 serves to move an elongated unlinked strand 54 of sausage material to a location essentially above crimping wheel 38. As will be discussed more fully hereafter, the strand 54 is converted into a plurality of links 56 (FIG. 2) created at linking points 58 (FIG. 6) which are the points of compression in the strand 54 created by the coaction of crimper elements 46 and bars 34 (FIGS. 7, 8 and 10). When the cutting elements 32 are superimposed upon each other at the eight o'clock position as discussed above, the links 56 are cut at the linking points 58 to create a plurality of cut links 60 (FIG. 1).

A torsion mechanism 62 for adjustably changing the downward pressure on crimping wheel 38 is comprised of a link 64 which is rigidly secured to the shaft 37 supporting the crimping wheel (FIG. 6). A second link 66 is coextensive with link 64 and is rigidly secured thereto in any convenient way. A resilient but relatively stiff rubber insert 68 is secured in any convenient way to the free end of link 66. The rubber insert 68 is inserted within bore 70 of plug 62 and is rigidly secured to the plug 72 by pin 73. An arm 74 is rigidly secured to the free end of plug 72 and extends outwardly therefrom to be adjustably secured to frame 12 by adjustable socket 76 mounted on post 78 which in turn is rigidly secured to frame 12 (FIG. 1). The adjustable position of arm 74 with respect to post 78 determines the amount of torsion or twist that is applied to the rubber inserts 68 which in turn determines the amount of downward force applied to the shaft 16 and the crimper wheel 38. Thus, the downward pressure of the crimping wheel 38 can be adjusted in the manner indicated to effect different crimping pressure of the crimping elements 46 on bore 34.

In operation, the conveyor 50 is actuated to cause the unlinked strand 54 of sausage material to be threaded into the track 43 of crimper wheel 38 in a tangential direction as best shown in FIG. 1. The strand 54 is then directed between the crimping wheel 38 and one of the conveying and cutting assemblies 26 so that the crimper elements 46 registering with the bars 34 (FIGS. 8 and 10) can compress or crimp the sausage strand at a linking point 58 as shown in FIGS. 6 and 7. By precrimping the strand 54 in the manner described, the sausage emulsion 80 within casing 82 is relocated to form a substantially rounded end 84 at each side of the linking point 58. This is done without cutting the linking point 58 and without breaking the casing 82. Thus, the precrimping sets the stage for the linking point to be cut in the manner described above at the eight o'clock position of the wheel 18 as previously described. This avoids the possibility of rupturing the casing during the cutting position which might be the case if the cutting assemblies merely severed a full diameter of sausage strand 54.

Thus, from the foregoing, it is seen that this invention will achieve at least all of its stated objectives.

What is claimed is:

1. A method of precrimping a sausage strand to precondition the strand for cutting into sausage links, comprising, continuously moving an elongated sausage strand having a casing layer overlaying a core material of less hardness than the casing layer, intermittently applying compressing forces to the strand at spaced link points along the length of the strand to move the core material away from the link points, releasing the compressed strand, thence sequentially moving the released compressed strand and subsequently and sequentially cutting the same at the link points where compression has taken place to form a plurality of sausage links.

2. The method of claim 1 where the sausage strand is coextruded and the core is a plastic core of meat emulsion and the casing layer is a layer of coagulated edible material of greater stiffness than the core.

3. The method of claim 1 wherein the sausage strand is a strand of meat emulsion housed in a tubular non-meat material.

4. An apparatus for precrimping a sausage strand at spaced link points for cutting the strand into individual sausage links, comprising, a frame, a first wheel rotatably mounted on the frame on an axis and having an outer periphery, a power unit operatively secured to the first wheel for rotating the same, a plurality of spaced conveying and cutting assemblies mounted on the outer periphery of the first wheel and having opposite laterally slidable sausage link cutting elements thereon, a cam on the first wheel being operative with cam elements on the conveying and cutting assemblies to cause the cutting elements to converge on each other at times to cut a sausage strand that may be disposed on the periphery of said first wheel between pairs of opposite link cutting elements, a crimping wheel rotatably mounted on the machine and having a sausage strand passage formed on an outer perimeter, a plurality of laterally extending spaced crimper elements on the crimping wheel spaced radially a distance equal to the length of the links to be cut from a sausage strand and being spaced a radial distance equal to the distance between the conveying and cutting assemblies on the first wheel, the crimping wheel having a plurality of radially extending teeth with radial space therebetween engaging a laterally extending bar assembly on the conveying and cutting assemblies on the first wheel so that rotation of the first wheel will rotate the crimping wheel, the crimper elements being located radially between the teeth on the crimping wheel, whereupon a sausage strand threaded between the crimping wheel and the first wheel will have portions of its length compressed between the crimping elements on the crimping wheel and the bar assemblies on the conveying and cutting assemblies to facilitate the subsequent cutting of the strand at the compressed portions, the cam and cam elements being operative to cause the cutting elements to converge on each other to cut the strand at the compressed portions of the strand after the compressed portions have longitudinally departed the location where they were compressed.

5. The apparatus of claim 4 wherein a yieldably torsion element is secured to the crimping wheel to enhance the pressure of its engagement with the first wheel.

6. The apparatus of claim 4 wherein the crimping elements are disposed between opposite plates, with the teeth on the crimping wheel being located adjacent the periphery of each plate.

7. The apparatus of claim 5 wherein the crimping elements have arcuate leading and trailing edges to create arcuate shapes in the sausage strand adjacent the compressed portions of the sausage strand.

8. The apparatus of claim 4 wherein the crimping wheel is located at a twelve o'clock position with respect to the first wheel.

9. The apparatus of claim 7 wherein the cam and cam elements are operative to cut the strand at the crimped portions at about an eight o'clock position on the first wheel.

10. The apparatus of claim 8 wherein a conveyor on the machine is located to carry the cut sausage links away from the first wheel after the strand is cut at the compressed portions.

11. The apparatus of claim 4 wherein the torsion element has an adjustable component so that the pressure can be selectively adjusted.

\* \* \* \* \*